United States Patent [19]

Franks et al.

[11] 4,247,688

[45] Jan. 27, 1981

[54] COMPOSITION AND PROCESS FOR MAKING PRECIPITATED HYDROXYETHYLCELLULOSE

[75] Inventors: Neal E. Franks, Suffern, N.Y.; Julianna K. Varga, Asheville, N.C.

[73] Assignee: Akzona Incorporated, Asheville, N.C.

[21] Appl. No.: 54,356

[22] Filed: Jul. 2, 1979

Related U.S. Application Data

[63] Continuation-in-part of Ser. No. 938,907, Sep. 1, 1978, which is a continuation-in-part of Ser. No. 854,957, Nov. 25, 1977, Pat. No. 4,145,532.

[51] Int. Cl.³ .................. C08B 11/22; C08L 1/28
[52] U.S. Cl. ............................ 536/96; 106/169; 106/170; 106/197 R
[58] Field of Search .................. 536/96; 106/169, 170, 106/197 R

[56] References Cited

U.S. PATENT DOCUMENTS

| | | | |
|---|---|---|---|
| 2,179,181 | 11/1939 | Graenacher et al. | 106/163 R |
| 3,447,939 | 6/1969 | Johnson | 536/43 |
| 3,508,941 | 4/1970 | Johnson | 106/162 |
| 4,145,532 | 3/1979 | Franks et al. | 536/56 |

Primary Examiner—Ronald W. Griffin
Attorney, Agent, or Firm—Francis W. Young; Jack H. Hall; H. Walter Haeussler

[57] ABSTRACT

A composition and process are provided for making precipitated hydroxyethyl cellulose by dissolving a hydroxyethyl cellulose having a molar substitution of less than 1.0, and a degree of substitution of less than about 0.64 in mixture of water and a tertiary amine oxide solvent, to provide a solution containing from about 10% to about 28% water. Shaped articles can be formed from the solutions of the invention.

12 Claims, 1 Drawing Figure

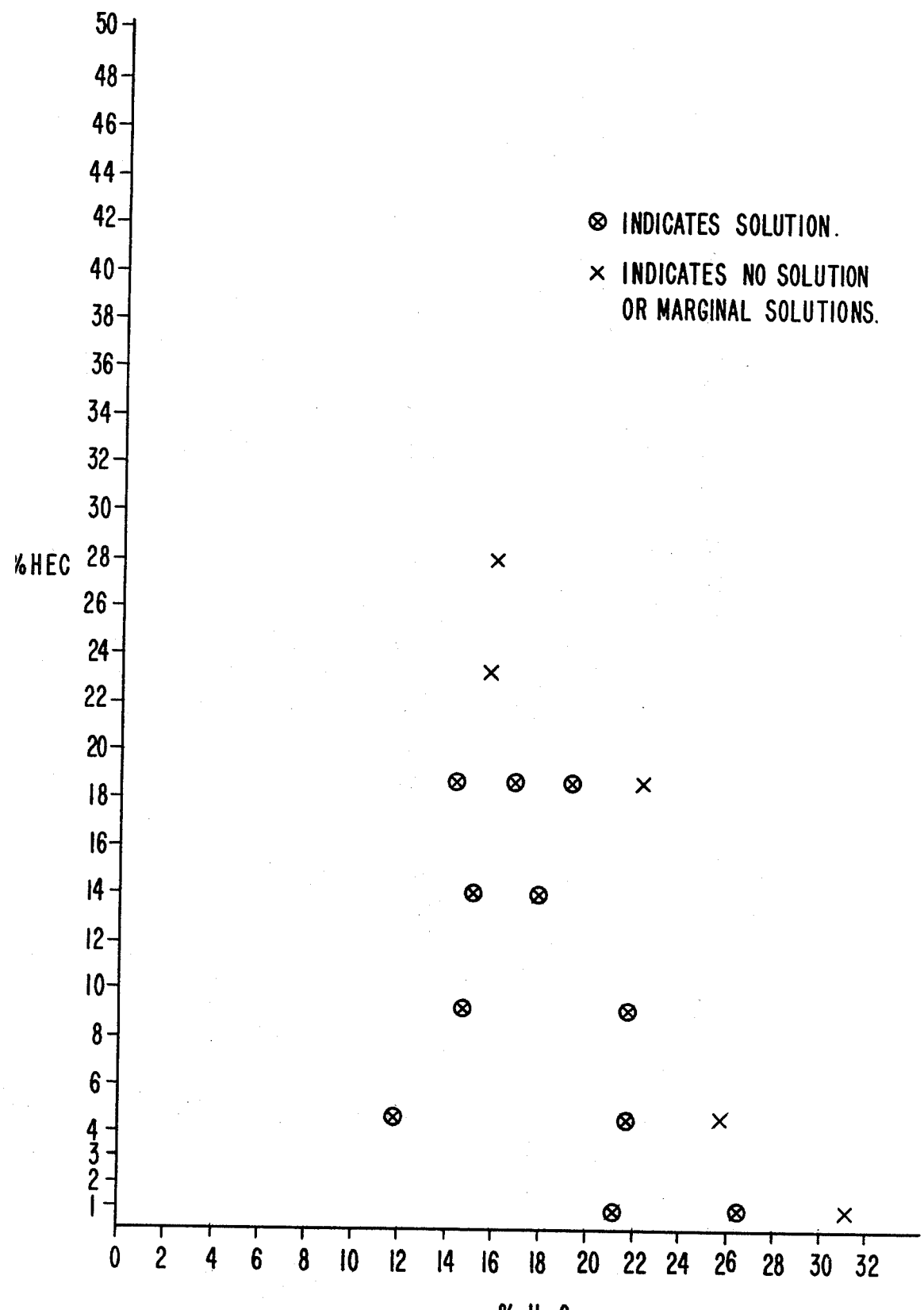
FIG. I

COMPOSITION AND PROCESS FOR MAKING PRECIPITATED HYDROXYETHYLCELLULOSE

CROSS REFERENCE TO RELATED APPLICATIONS

This application is a continuation-in-part of application Ser. No. 938,907 filed Sept. 1, 1978, which in turn is a continuation-in-part of application Ser. No. 854,957, filed Nov. 25, 1977, now U.S. Pat. No. 4,145,532.

BACKGROUND OF THE INVENTION

A process for dissolving cellulose and several cellulose derivatives having strong intermolecular hydrogen bonding in a tertiary amide oxide is disclosed by Johnson in U.S. Pat. No. 3,447,939. A cyclic mono(N-methylamine-N-oxide) compound such as N-methylmorpholine N-oxide is used as the solvent. The solution can be used in chemical reactions involving the dissolved polymer or to precipitate the polymer to form a film or filament. The resulting solutions, insofar as the actual examples of the patent indicate, have significant disadvantages because they are of low solids content and have a high viscosity.

In accordance with the process disclosed in U.S. Pat. No. 3,508,941, two or more different polymers are dissolved in a cyclic mono(N-methylamine N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiences noted for the first mentioned patent.

U.S. Pat. No. 4,145,532 and copending application Ser. No. 938,907, filed Sept. 1, 1978, to the inventors herein, discloses cellulose solutions and precipitated cellulose articles formed from a tertiary amine oxide solvent containing up to about 29% water.

DESCRIPTION OF THE DRAWING

FIG. 1 is a graphic presentation of the solubility data of Example 1.

DESCRIPTION OF THE INVENTION

This invention relates to compositions and processes for forming solutions of hydroxyethylcellulose having a molar substitution (MS) of less than 1.0 and a degree of substitution (DS) of less than 0.64, in a tertiary amine oxide solvent-water mixture, containing a hydroxyethylcellulose solubility enhancing amount of water from about 10% to about 28% based on the total solution. Shaped articles can be formed from the solutions of the invention.

The hydroxyethylcellulose solutions of the invention can contain higher concentrations of hydroxyethylcellulose in a tertiary amine oxide than those solutions which have been available heretofore. Solutions containing up to about 20% by weight of hydroxyethylcellulose can be achieved. In addition, the solutions of the invention are formed at temperatures significantly lower than those required when employing anhydrous amine oxide, and the resultant solutions display less decomposition as compared to the anhydrous systems.

The hydroxyethylcellulose solutions of the invention are adapted for shaped article production such as by extrusion or spinning followed by coagulation in a non-solvent, for example water, and washing to remove the solvent from the shaped films or filaments.

In the process of the invention hydroxyethylcellulose is mixed with a solvent therefor comprising a tertiary amine oxide containing water in a specifically defined critical range to provide a solution of increased solids content.

The range of the amount of water present in the solution is a hydroxyethylcellulose solubility enhancing amount between about 10% to about 28%, and preferably between about 11% to about 28% by weight of water based upon the weight of the solution. The maximum amount of water which can be employed to form the solutions of the invention generally decreases as the amount of hydroxyethylcellulose (having a MS lower than 1.0) present in the composition increases.

As decomposition is significantly accelerated above about 105° C., it is highly preferred that the amount of water employed in forming the solutions of the invention be an amount of water which allows the formation of a solution at a temperature of about 105° C. or lower.

The following amine oxides can be used to form the solutions of the invention:
N-methylhomopiperidine oxide
N-methylmorpholine oxide
N,N-dimethylcyclohexylamine oxide
N,N-dimethylbenzylamine oxide The foregoing amine oxides may be represented by one of the following formulae:

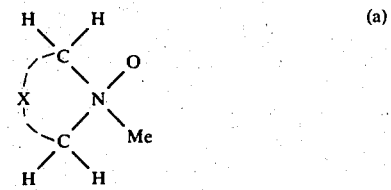

(a)

where X is a radical chain completing a ring comprising 2 to 4 carbon atoms;

(b)

wherein Me is methyl and Z is (i) an aromatic or saturated or unsaturated 5-, 6-, or 7-membered ring, unsubstituted or substituted only by methyl in positions where the resulting ring width is less than about 5.15 Å, or (ii) CH₂CH₂W where W can be OH, SH or NH₂.

Several solvents coming within the invention that do not meet the cyclic requirements can be explained on the basis of a "pseudo-ring" structure. For instance, N,N-dimethylethanolamine oxide can be represented by a ring structure which may explain its ability to dissolve hydroxyethylcellulose as follows:

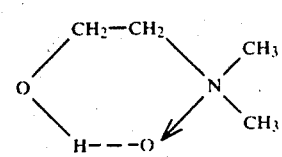

An exception to the cyclic structure proposed, mentioned previously, is N,N,N-triethylamine oxide.

Tertiary amine oxides which may be used to advantage when mixed with water in practicing the invention include dimethylethanolamine oxide, N,N-dimethylbenzylamine oxide, N,N,N-triethylamine oxide, N,N-dimethylcyclohexylamine oxide, N-methylmorpholine oxide, N-methylhomopiperdine oxide and 2-(2 hydroxypropoxy)-N-ethyl-N,N-dimethylamine oxide.

As pointed out above, the percentage range of water required in the solvent will vary with the tertiary amine oxide in the solvent.

It is noted that the amine oxides contemplated by the invention are sometimes referred to as amine oxides. They are more properly termed "tertiary amine N-oxides".

The hydroxyethylcellulose polymers which can be employed in this invention can be any hydroxyethylcellulose polymer having a MS of less than about 1.0 and a DS of less than about 0.64.

There follow examples of the invention which are considered illustrative rather than limiting. All parts and percentages are by weight unless otherwise specified. All temperatures are in degrees Centigrade.

EXAMPLE 1

Solubility trials were carried out employing a stirred mixture of ITT-Rayonier standard DP Ethynier (325 DP, 3.9% ETO, DS 0.15), N-methylmorpholine oxide and water in a glass container adapted for insertion into a glycerine bath used to heat the sample. If desired, final solution water content determinations can be made using a C-Aquatester, (Cat. No. 04-10-000, C. W. Brabender Instruments Co., S. Hackensack, N.J.). The trials are summarized in Table 1 and FIG. 1.

TABLE 1

SOLUBILITY OF HYDROXYETHYCELLUOSE (HEC) IN N-METHYLMRPHOLINE-N-OXIDE METHYLMORPHOLINE- 15 (N-O)

| Run # | Starting Composition | | | Dissolution Temperature °C. | Remarks |
|---|---|---|---|---|---|
| | HEC % | N-O% | H₂O % | | |
| 1 | 0.9 | 77.8 | 21.3 | 95–96 | sol'n. in 15 minutes, light in color |
| 2 | 0.9 | 72.8 | 26.2 | 95–96 | sol'n. in 15 minutes, light in color |
| 3 | 0.9 | 67.9 | 31.1 | 95–96 | no sol'n. in 30 minutes |
| 4 | 4.7 | 83.7 | 11.6 | 95–96 | sol'n. in 30 minutes, light in color |
| 5 | 4.7 | 73.8 | 21.5 | 95–96 | sol'n. in 30 minutes, light in color |
| 6 | 4.7 | 68.9 | 26.4 | 95–96 | no sol'n. in 30 minutes |
| 7 | 9.4 | 75.8 | 14.8 | 95–96 | sol'n. in 30 minutes, amber in color |
| 8 | 9.4 | 68.9 | 21.7 | 95–96 | sol'n. in 30 minutes, amber in color |
| 9 | 14.1 | 70.9 | 15.0 | 95–96 | sol'n. in 30 minutes, amber in color |
| 10 | 14.1 | 68.9 | 17.0 | 95–96 | sol'n. in 30 minutes, amber in color |
| 11 | 18.8 | 66.0 | 15.3 | 95–96 | sol'n. in 30 minutes, amber in color |
| 12 | 18.8 | 64.0 | 17.2 | 95–96 | sol'n. in 30 minutes, amber in color |
| 13 | 18.8 | 62.0 | 19.2 | 95–96 | sol'n. in 30 minutes, amber in color |
| 14 | 18.8 | 59.1 | 22.2 | 95–96 | marginal sol'n. in 30 minutes, dark amber in color |
| 15 | 18.8 | 59.1 | 22.2 | 95–96 | marginal sol'n. in 45 minutes, color: very dark |
| 16 | 23.5 | 61.0 | 15.5 | 95–96 | very marginal sol'n. in 30 minutes at 95–96° C. + 30 minutes at 100° C. black in color |
| 17 | 28.2 | 56.1 | 15.7 | 95–96 | decomposed after heating 45 minutes, amine odor |

It is noted that in the above solubility trials, the solutions, when examined under a microscope, contained a very small number of undissolved fibers, the number of which did not appear to be polymer quantity dependent. It is believed that the presence of these fibers is due to the mixing equipment rather than the inability to form a solution. If desired, these very few fibers can be removed by filtration.

EXAMPLE 2

Solutions of the hydroxyethylcellulose (HEC), as in Example 1, were attempted in mixtures of N,N-dimethylethanolamine N-oxide (DMEAO) and water by admixing measured amounts of DMEAO and water in a dish which was introduced into a glycol bath at 110° C. The mixture was stirred until it became clear. An amount of HEC was then added to the amine oxide-water mixture and stirred with continued heating until either a solution was achieved or decomposition noted.

The results are summarized in Table 2.

TABLE 2

SOLUBILITY OF HEC IN N,N-DIMETHYLETHANOLAMINE DIMETHYLETHANOLAMINE N-OXIDE (N-O)

| Run # | Starting Composition | | | Dissolution Temperature °C. | Time Minutes | Remarks |
|---|---|---|---|---|---|---|
| | HEC % | N-O% | H₂O % | | | |
| 1 | 4.7 | 84.6 | 10.8 | 105 | 20 | dark amber color solution |
| 2 | 4.7 | 76.5 | 18.8 | 98–100 | 20 | light color solution |
| 3 | 9.4 | 80.1 | 10.5 | 105 | 30 | dark amber color solution |
| 4 | 9.4 | 74.8 | 15.8 | 98–100 | 35 | no solution |
| 5 | 9.4 | 71.2 | 19.4 | 98–100 | 35 | no solution |
| 6 | 9.4 | 73.3 | 17.3 | 98–100 | 120 | no solution |
| 7 | 15.0 | 69.8 | 15.2 | 98–100 | 45 | light color, highly viscous solution |
| 8 | 18.8 | 70.6 | 10.6 | 98–100 | 60 | dark amber color solution |
| 9 | 18.8 | 65.0 | 16.2 | 98–100 | 60 | no solution |
| 10 | 1.0 | 88.0 | 11.0 | 110 | — | no solution |
| 11 | 1.0 | 84.0 | 15.0 | 110 | — | no solution |
| 12 | 1.0 | 74.0 | 25.0 | 105–110 | 25 | light color solution |

EXAMPLE 3

Solubility trials were conducted with N-methylmorpholine N-oxide (NMMO)-water and the hydroxyethylcellulose (HEC) as in Example 1. The trials were carried out in an Atlantic CVZ Research mixer using NMMO containing 1.66% water and HEC containing 6.1% water. Varying amounts of water were added to several HEC concentrations. The mixtures were stirred at 95°–96° C. at 100 RPM. Samples were observed under a microscope to determine completion of a solution.

Solution A: 77.8% amine oxide; 21.3% $H_2O$; 0.9% HEC-HEC completely dissolved at 95°–96° C. after heating for 15 minutes. The solution was a low viscosity, light colored solution.

Solution B: 72.8% amine oxide, 26.2% $H_2O$; 0.9% HEC-HEC completely dissolved at 95°–86° C. after heating for 15 minutes. The solution was light colored.

As can be seen from the above examples, a maximum of about 20% by weight of hydroxyethylcellulose can be dissolved by the process of the invention. Depending on the type of hydroxyethylcellulose and the amine oxide, in certain instances, an amount less than 20% by weight is the maximum amount of hydroxyethylcellulose which can be dissolved. In any event, substantial amounts of hydroxyethylcellulose, for example, from 1% or 5% up to 10 or 20%, typically readily dissolve to form useful solutions.

Further while not exemplified, if desired, mixtures of amine oxides can be employed.

If desired, a non-reactive organic co-solvent may be used in quantities up to, for example, about 25% by weight of the total solution, for example, as a less expensive diluent for the amine oxide, or to lower the viscosity of the solution.

It is noted that amine oxides are hygroscopic, and thus, tend to pick up water from the air at normal temperatures or up to a certain predetermined temperature, above which when in a dimixture with water, they tend to release water vapor. The solution procedure and water measurement procedure thus have some bearing on the amount of water initially employed and subsequently measured.

As used herein "substantial stability" means sufficient stability to provide useful shaped polymer forming solutions.

While the invention is described in detail above, it is understood that variation can be made by those skilled in the art without departing from the scope of the invention.

What is claimed is:

1. A solution comprising
   (a) hydroxyethylcellulose having a molar substitution of less than 1.0 and a degree of substitution of less than 0.64,
   (b) a tertiary amine oxide hydroxyethylcellulose solvent, and
   (c) a hydroxyethylcellulose solubility enhancing amount of water.

2. The solution as in claim 1, where the amount of water is between about 10% to about 28% by weight of the total solution.

3. The solution as in claims 1 or 2 where the amine oxide is N-methylmorpholine N-oxide.

4. The solution as in claims 1 or 2 where the amine oxide is N,N-dimethylethanolamine N-oxide.

5. The solutions as in claims 1 or 2, where the solutions contain at least 1% by weight of hydroxyethylcellulose.

6. In a process for precipitating hydroxyethylcellulose from a solution thereof which comprises dissolving the hydroxyethylcellulose in a solvent for the hydroxyethylcellulose containing a tertiary amine oxide and thereafter shaping the solution and separating the hydroxyethylcellulose from the tertiary amine oxide, the improvement wherein the solution is prepared by dissolving at least about 1% by weight of hydroxyethylcellulose having a molar substitution of less than 1.0 and a degree of substitution of less than 0.64 in a tertiary amine oxide solvent which contains a hydroxyethylcellulose solubility enhancing amount of water.

7. The process as in claim 6 where the amount of water is between about 10% to about 28% by weight of the total solution.

8. The process as in claims 6 or 7 where the amine oxide is N-methylmorpholine-N-oxide.

9. The process as in claims 6 or 7 where the amine oxide is N,N-dimethylethanolamine N-oxide.

10. The process as in claims 6 or 7 where the solution contains at least 1% by weight of hydroxyethylcellulose.

11. The process as in claims 6 or 7 wherein the amount of water present is an amount which allows the formation of a solution at a temperature of about 105° C. or lower.

12. The process as in claims 6 or 7 wherein the amine oxide has substantial stability at about 100° C.

* * * * *